(12) United States Patent
Basso et al.

(10) Patent No.: US 7,409,520 B2
(45) Date of Patent: Aug. 5, 2008

(54) SYSTEMS AND METHODS FOR TIME DIVISION MULTIPLEX MULTITHREADING

(75) Inventors: Claude Basso, Raleigh, NC (US); Jean Louis Calvignac, Raleigh, NC (US); Chih-jen Chang, Apex, NC (US); Gordon Taylor Davis, Chapel Hill, NC (US); Harm Peter Hofstee, Austin, TX (US); Fabrice Jean Verplanken, LaGaude (FR); Colin Beaton Verrilli, Apex, NC (US)

(73) Assignee: International Business Machines Corporation, Armonk, NY (US)

( * ) Notice: Subject to any disclaimer, the term of this patent is extended or adjusted under 35 U.S.C. 154(b) by 303 days.

(21) Appl. No.: 11/042,692

(22) Filed: Jan. 25, 2005

(65) Prior Publication Data
US 2006/0168583 A1 Jul. 27, 2006

(51) Int. Cl.
*G06F 12/00* (2006.01)
(52) U.S. Cl. ................................ 711/170; 718/102
(58) Field of Classification Search ................ 711/170; 718/102
See application file for complete search history.

(56) References Cited

U.S. PATENT DOCUMENTS

| | | | |
|---|---|---|---|
| 5,390,192 A * | 2/1995 | Fujieda | 714/744 |
| 5,455,924 A * | 10/1995 | Shenoy et al. | 711/118 |
| 2002/0083297 A1 | 6/2002 | Modelski et al. | |
| 2003/0061445 A1 | 3/2003 | Birk et al. | |
| 2003/0158885 A1 * | 8/2003 | Sager | 709/108 |
| 2004/0201592 A1 * | 10/2004 | Huang | 345/558 |
| 2006/0056290 A1 * | 3/2006 | Hass | 370/229 |
| 2006/0136915 A1 * | 6/2006 | Aingaran et al. | 718/100 |

FOREIGN PATENT DOCUMENTS

| | | |
|---|---|---|
| EP | 1221654 A2 | 7/2002 |
| JP | 2000020323 A | 1/2000 |
| JP | 2002268878 A | 9/2002 |

* cited by examiner

*Primary Examiner*—Gary J Portka
*Assistant Examiner*—Yong J. Choe
(74) *Attorney, Agent, or Firm*—Joscelyn G. Cockburn; Schubert Osterrieder Nickelson PLLC (57) ABSTRACT

Systems and methods for distributing thread instructions in the pipeline of a multi-threading digital processor are disclosed. More particularly, hardware and software are disclosed for successively selecting threads in an ordered sequence for execution in the processor pipeline. If a thread to be selected cannot execute, then a complementary thread is selected for execution.

4 Claims, 5 Drawing Sheets

SYSTEMS AND METHODS FOR TIME DIVISION MULTIPLEX MULTITHREADING

FIELD

The present invention is in the field of providing instruction threads to a multi-stage digital processor. More particularly, the invention is in the field of multiplexing thread instructions in a computational pipeline.

BACKGROUND

Many different types of computing systems have attained widespread use around the world. These computing systems include personal computers, servers, mainframes and a wide variety of stand-alone and embedded computing devices. Sprawling client-server systems exist, with applications and information spread across many Personal Computer PC networks, mainframes and minicomputers. In a distributed system connected by networks, a user may access many application programs, databases, network systems, operating systems and mainframe applications. Computers provide individuals and businesses with a host of software applications including word processing, spreadsheet, accounting, e-mail, voice over Internet protocol telecommunications, and facsimile.

Users of digital processors such as computers continue to demand greater and greater performance from such systems for handling increasingly complex and difficult tasks. In addition, processing speed has increased much more quickly than that of main memory accesses. As a result, cache memories, or caches, are often used in many such systems to increase performance in a relatively cost-effective manner. Many modern computers also support "multi-tasking" in which two or more programs are run at the same time. An operating system controls the alternation between the programs, and a switch between the programs or between the operating system and one of the programs is called a "context switch."

Additionally, multi-tasking can be performed in a single program, and is typically referred to as "multi-threading." Multiple program actions can be processed concurrently using multi-threading. Most multi-threading processors work exclusively on one thread at a time. For example, a multi-threading processor may execute n instructions from thread a, then execute n instructions from thread b, where n is an integer and threads a and b are instructions for two different programs or from the same program. There also exist fine-grain multi-threading processors that interleave different threads on a cycle-by-cycle basis, i.e., n=1. Both types of multi-threading interleave the instructions of different threads on long-latency events.

Modern computers include at least a first level cache L1 and typically a second level cache L2. This dual cache memory system enables storing frequently accessed data and instructions close to the execution units of the processor to minimize the time required to transmit data to and from memory. L1 cache is typically on the same chip as the execution units. L2 cache is external to the processor chip but physically close to it. Ideally, as the time for execution of an instruction nears, instructions and data are moved to the L2 cache from a more distant memory. When the time for executing the instruction is near imminent, the instruction and its data, if any, is advanced to the L1 cache.

As the processor operates in response to a clock, data and instructions are accessed from the L1 cache for execution. A cache miss occurs if the data or instructions sought are not in the cache. The processor would then seek the data or instructions in the L2 cache. A cache miss may occur at this level as well. The processor would then seek the data or instructions from other memory located further away. Thus, each time a memory reference occurs which is not present within the first level of cache the processor attempts to obtain that memory reference from a second or higher level of cache. The benefits of a cache are maximized whenever the number of cache hits greatly exceeds the number of cache misses. When a cache miss occurs, execution of the instructions of the current thread is suspended while awaiting retrieval of the expected data or instructions. During this time, while the system is awaiting the data or instructions for the thread, the processor execution units could be operating on another thread. In a multi-threading system the processor would switch to another thread and execute its instructions while operation on the first thread is suspended. Thus, thread selection logic is provided to determine which thread to be next executed by the processor.

A common architecture for high performance, single-chip microprocessors is the reduced instruction set computer (RISC) architecture characterized by a small simplified set of frequently used instructions for rapid execution. Thus, in a RISC architecture, a complex instruction comprises a small set of simple instructions that are executed in steps very rapidly. As semiconductor technology has advanced, the goal of RISC architecture has been to develop processors capable of executing one or more instructions on each clock cycle of the machine. Execution units of modern processors therefore have multiple stages forming an execution pipeline. On each cycle of processor operation, each stage performs a step in the execution of an instruction. Thus, as a processor cycles, an instruction advances through the stages of the pipeline. As it advances it is executed. Pipeline instruction execution allows subsequent instructions to begin execution before previously issued instructions have finished. A cache miss may occur when an instruction is at any stage of the pipeline. Ideally, when this occurs, an instruction of a different thread is placed in the pipeline at the next processor cycle and the suspended thread is advanced without execution.

Multithreading permits the processors' pipeline to do useful work on different threads when a pipeline stall condition is detected for the current thread. Various thread selection logic units have been proposed for controlling the order in which thread instructions are sent to be executed. For example, a task-level dynamic scheme would entail continual execution of a first thread until a long latency event, such as a cache miss, occurs. Then, execution of the first thread is stopped and execution of a second thread commences. Execution of the second thread would continue until another long-latency event occurs. The objective of this scheme is to keep the processor as busy as possible executing instructions. However, the processor is required to handle data hazards because the same thread is likely to execute for many cycles. A data hazard occurs when data in a stage of the pipeline is required by another stage. Data forwarding between the stages of the processor pipeline is then necessary to ensure that data from one stage of the pipeline is available to another stage.

An instruction level dynamic scheme for thread selection is also known in the art. In this scheme, when a thread is dispatched, it remains active for only one cycle. The objective is to share the processor pipeline as fairly as possible between active threads, even if it increases the likelihood of all threads waiting simultaneously. The processor pipeline is still required to handle data hazards because the same thread can execute for many cycles back-to-back when only one thread is active.

Another scheme for thread selection is cycle-level Time Division Multiplex (TDM). In this method, all threads are dispatched in a fixed time division multiplexed pattern at each cycle. If a thread waits, (for example, because of a long latency read), its assigned cycle is lost. The objective is to eliminate data hazards in the processor pipeline. This is achieved when the number of multiplexed threads is at least equal to the number of stages in the pipeline. Note that processor use is not optimal because the wait cycles are multiplexed among the execution cycles causing idle cycles in the processor pipeline.

Thus, there is a need for a thread-switching method that minimizes data hazards and makes optimal use of the processor.

SUMMARY

The problems identified above are in large part addressed by systems and methods for thread-switching in a multi-threading processor. According to an aspect of the present invention, a number of threads are time-division multiplexed except that if a thread waits, its cycle is assigned to its complementary thread. This optimizes processor use because wait cycles may be replaced with execution cycles. Data hazards are also minimized. When the number of multiplexed threads is at least equal to the number of stages in the processor pipeline only one data hazard configuration must be handled.

Embodiments implement a method for thread allocation in multi-threading digital processing comprising forwarding an instruction of a first thread for execution in a digital processor if the first thread is not in a wait state, and forwarding an instruction of a second thread for execution in the processor if the first thread is in a wait state, where the second thread is the complement of the first thread. The complement of a thread, i, in an n-thread process is defined to be the thread numbered (i+n/2) modulo(n). Thus, in one embodiment of a 4-thread process, the complement of a thread, i, is (i+2) modulo(4). In an embodiment of an 8-thread process, the complement of a thread, i, is (i+4) modulo(8).

In one embodiment, a method for thread allocation in multi-stage, multi-thread digital processing is provided. The method comprises generating an address in a sequence of addresses, each address in the sequence enabling access to the contents of a different memory location, each memory location containing an instruction for a different thread, so that each address in the sequence corresponds to a different thread in a sequence of threads. The method further comprises determining if execution of a first thread corresponding to the generated address in the sequence of addresses is stalled. If the first thread is not stalled, the memory location corresponding to the generated address selected. If the first thread is stalled, a memory location corresponding to a complementary thread instruction is selected. The thread instruction from the selected memory location is submitted for execution.

In another embodiment, a multi-thread processor processes a sequence of instructions, each instruction in the sequence corresponding to a different thread. The embodiment comprises a plurality of execution stages, each stage capable of performing a step in the execution of an instruction. A plurality of memory locations is provided, each memory location having an address and capable of storing an instruction from a different one of a sequence of instruction threads. A time-division multiplexer repetitively generates an ordered sequence of memory location addresses for selecting thread instructions, each thread selected by accessing the contents of a different memory location, and each different memory location containing an instruction of a different thread. A complementary thread determiner determines an address that is the complement of an address generated by the time-division multiplexer. A thread selector selects a first thread instruction from an address provided by the multiplexer if the first thread is not in a waiting state and selects a second thread instruction from the complementary address determined by the complementary thread determiner if the first thread is in a waiting state.

Embodiments include a digital system with a multi-threading processor capable of executing instructions from multiple instruction threads in a sequence within a pipeline of processor stages. Embodiments include a memory with a plurality of memory locations for storing instructions of different threads. An address generator repetitively generates a sequence of addresses, each address corresponding to a different memory location in the memory, each of the different memory locations containing an instruction from a different thread in a sequence of threads. A complementary address determiner determines an address that is complementary to an address generated by the address generator. A thread address selector selects a first address generated by the address generator to address a memory location containing an instruction of a first thread if the first thread instruction can execute. Alternatively, the thread address selector selects the address that is complementary to the first address to address a memory location containing an instruction of a second thread if the first thread instruction cannot execute. A dispatch unit is provided to dispatch the selected instruction to an execution unit may also be provided. The execution unit comprises multiple stages for execution of instructions received from the dispatch unit. To overcome data hazards, data forwarding circuitry is provided to forward data from a stage in the processor to its complementary stage.

BRIEF DESCRIPTION OF THE DRAWINGS

Other objects and advantages of the invention will become apparent upon reading the following detailed description and upon reference to the accompanying drawings in which, like references may indicate similar elements.

DETAILED DESCRIPTION OF EMBODIMENTS

The following is a detailed description of example embodiments of the invention depicted in the accompanying drawings. The example embodiments are in such detail as to clearly communicate the invention. However, the amount of detail offered is not intended to limit the anticipated variations of embodiments; but, on the contrary, the intention is to cover all modifications, equivalents, and alternatives falling within the spirit and scope of the present invention as defined by the appended claims. The detailed descriptions below are designed to make such embodiments obvious to a person of ordinary skill in the art.

In one embodiment, a digital system with a multi-threading processor comprises a thread/complement multiplexer that provides a pointer to a memory location containing an instruction of a thread. The multiplexer repetitively generates an ordered sequence of addresses. Each address enables access to the contents of a different memory location, each memory location containing an instruction of a different thread. The address produced by the multiplexer will be the address of the instruction of the next thread in the sequence if that thread can execute. If that thread cannot execute, the address of the instruction of the complementary thread will be the address produced by the multiplexer. The complementary thread exhibits a determinable position in the sequence of threads with respect to the position of its complement. More precisely, the complement of a thread, i, in an n-thread process is defined to be the thread numbered (i+n/2) modulo(n).

Figure 1:
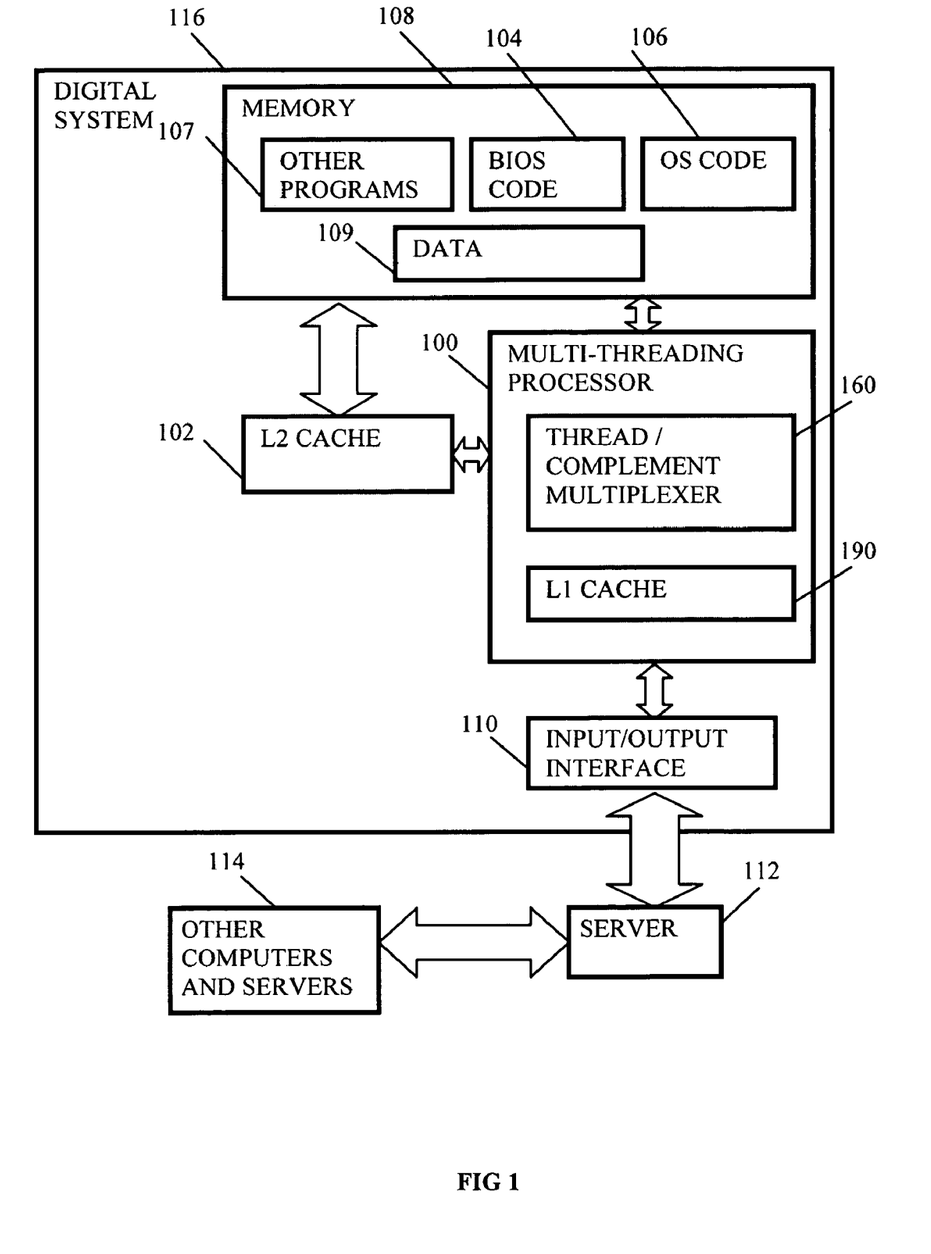
FIG. 1 depicts a digital system within a network; within the digital system is a multi-threading processor.

FIG. 1 shows a digital system 116 such as a computer or server implemented according to one embodiment of the present invention. Digital system 116 comprises a multi-threading processor 100 that can operate according to Basic Input/Output System BIOS Code 104 and Operating System (OS) Code 106. The BIOS and OS code is stored in memory 108. The BIOS code is typically stored on Read-Only Memory (ROM) and the OS code is typically stored on the hard drive of computer system 116. Memory 108 also stores other programs for execution by processor 100 and stores data 109 Digital system 116 comprises a level 2 (L2) cache 102 located physically close to multi-threading processor 100. Multi-threading processor 100 comprises an on-chip level one (L1) cache 190 and a Thread/Complement Multiplexer 160. Multiplexer 160 chooses threads in cyclical order subject to modification in the event of a wait state. The instruction of the chosen thread is dispatched to the processor execution units as will be described more fully below.

Digital system 116 also typically includes other components and subsystems not shown, such as: a Trusted Platform Module, memory controllers, random access memory (RAM), peripheral drivers, a system monitor, a keyboard, one or more flexible diskette drives, one or more removable non-volatile media drives such as a fixed disk hard drive, CD and DVD drives, a pointing device such as a mouse, and a network interface adapter, etc. Digital systems 116 may include personal computers, workstations, servers, mainframe computers, notebook or laptop computers, desktop computers, or the like. Processor 100 may also communicate with a server 112 by way of Input/Output Device 110. Server 112 connects system 116 with other computers and servers 114. Thus, digital system 116 may be in a network of computers such as the Internet and/or a local intranet.

In one mode of operation of digital system 116, data and instructions expected to be processed in a particular order in the processor pipeline of processor 100 are received by the L2 cache 102 from memory 108. L2 cache 102 is fast memory located physically close to processor 100 to achieve greater speed. The L2 cache receives from memory 108 the instructions for a plurality of instruction threads that are preferably independent; that is, execution of an instruction of one thread does not first require execution of an instruction of another thread. Normally this is the case when data from one thread is not required by another thread. The L1 cache 190 is located in the multi-threading processor and contains data and instructions preferably received from L2 cache 102. Ideally, as the time approaches for a program instruction to be executed, it is passed with its data, if any, first to the L2 cache, and then as execution time is near imminent, the instruction is passed to the L1 cache.

A thread can become stalled in its execution for a plurality of reasons. A thread is stalled if its execution must be suspended or stopped. One cause of a stalled instruction is a cache miss. A cache miss occurs if, at the time of performing a step in the execution of an instruction, the instruction, or the data required for its execution, is not in the L1 cache. If a cache miss occurs, data and instructions can be received into the L1 cache directly from memory 108, bypassing the L2 cache. Accessing data and instructions in the event of a cache miss is a relatively slow process. When a cache miss occurs, a thread cannot continue execution until the missing data or instruction is retrieved. While this first thread is waiting, feeding instructions of other threads to the pipeline for execution is desirable. Thus, thread/complement multiplexer 160 selects the complement thread instruction to place in the pipeline in the event a thread is stalled.

The complement of a thread, i, in an n-thread process is defined to be the thread numbered (i+n/2) modulo(n). For example, in a 4-thread process, thread 3 is the complement of thread 1 and vice versa. Similarly, thread 4 is the complement of thread 2 and vice versa. Thus, if thread 1 is stalled, it would be replaced by thread 3. If thread 2 is stalled, it is replaced by thread 4. If thread 3 is stalled it is replaced by thread 1, and if thread 4 is stalled it is replaced by thread 2. The choice of the complement thread is made to optimize processor use and overcome data hazards. Processor use is optimized when the complement thread is not in a wait state. Data hazards are overcome using only a minimal amount of data forwarding circuitry as will be described below.

Figure 2:
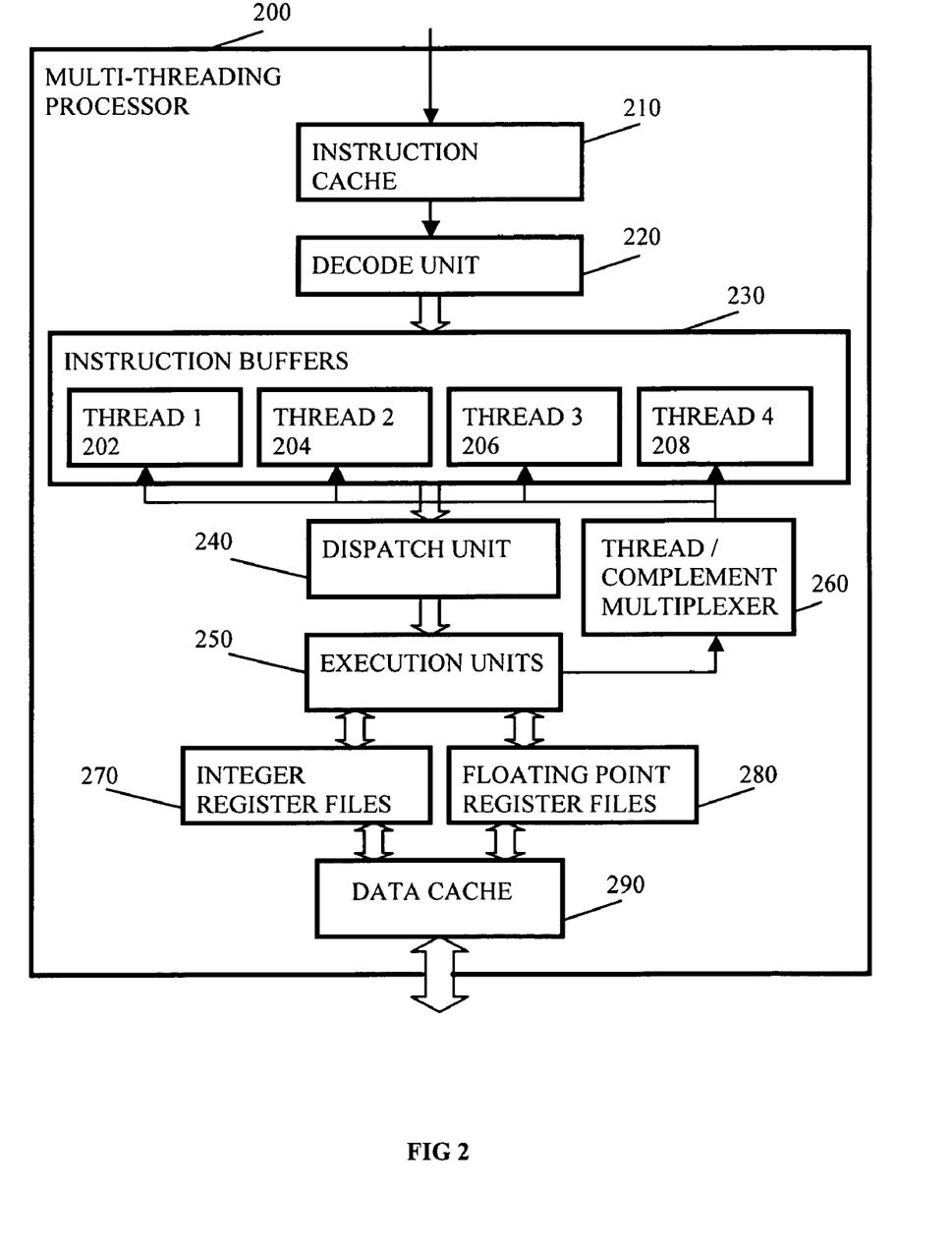
FIG. 2 depicts a multi-threading processor that processes instructions of multiple threads in a sequence.

FIG. 2 shows an embodiment of a 4-thread multi-threading processor 200 that can be implemented in a digital system such as digital system 116. A level 1 instruction cache 210 receives instructions from memory external to the processor, such as level 2 cache. In one embodiment, as instructions for different threads approach a time of execution, they are transferred from a more distant memory to an L2 cache. As execution time for an instruction draws near it is transferred from the L2 cache to the L1 instruction cache 210. From there the instruction is transferred to a decode unit 220. Decode unit 220 decodes the instructions received from instruction cache 210.

The decoded instructions are passed on a bus to instruction buffers 230. Instruction buffers 230 comprise a memory location for each thread to be processed. Thus, in the 4-thread system shown in FIG. 2, there are buffers 202, 204, 206 and 208 for threads 1, 2, 3 and 4, respectively. Each memory location can be addressed by an address received from a thread/complement multiplexer 260. Each of the four memory locations contains an instruction of a different one of the four threads. Addressing a memory location with the address received from thread/complement multiplexer 260 places the contents of the memory location on a bus to be transferred to a dispatch unit 240.

Dispatch unit 240 dispatches the thread instruction selected by multiplexer 260 to execution units 250. Execution units 250 may comprise load/store units, integer Arithmetic/Logic Units, floating point Arithmetic/Logic Units, and Graphical Logic Units. Execution units 250 comprise stages to perform steps in the execution of instructions received from dispatch unit 240. Data processed by execution units 250 are storable in and accessible from integer register files 270 and floating point register files 280. Data stored in these register files can also come from or be transferred to an on-board data cache 290 or an external cache or memory. Each stage of execution units 250 is capable of performing a step in the execution of an instruction of a different thread. The instructions of threads can be submitted by dispatch unit 340 to execution units 250 in a preferential order.

In each cycle of operation of processor 200, execution of an instruction progresses to the next stage through the processor pipeline within execution units 250. Those skilled in the art will recognize that the stages of a processor "pipeline" may include other stages not within the execution units 250 and not shown in FIG. 2. For simplicity we may consider the stages of the execution units to be the stages of the processor "pipeline." Thus, in a first cycle, processor stage 1 will perform a first step in the execution of an instruction of a first thread. In a second cycle, next subsequent to the first cycle, processor stage 2 will perform a next step in the execution of the instruction of the first thread. During the second cycle, processor stage 1 performs a first step in the execution of an instruction of a second thread. And so forth. At each processor cycle a different one of the buffers 202, 204, 206, or 208 is selected for its contents to be sent to dispatch unit 240.

Dispatch unit 240 dispatches the selected instruction to the execution units 250. Normally, the selected thread will be the next thread in the circular sequence of threads, 1, 2, 3, 4, 1, 2 . . . But if that next thread is in a wait status, then the complementary thread is selected in its place. In this case, the instruction of the complementary thread is sent to the dispatch unit instead of the next thread in the sequence.

Figure 3:
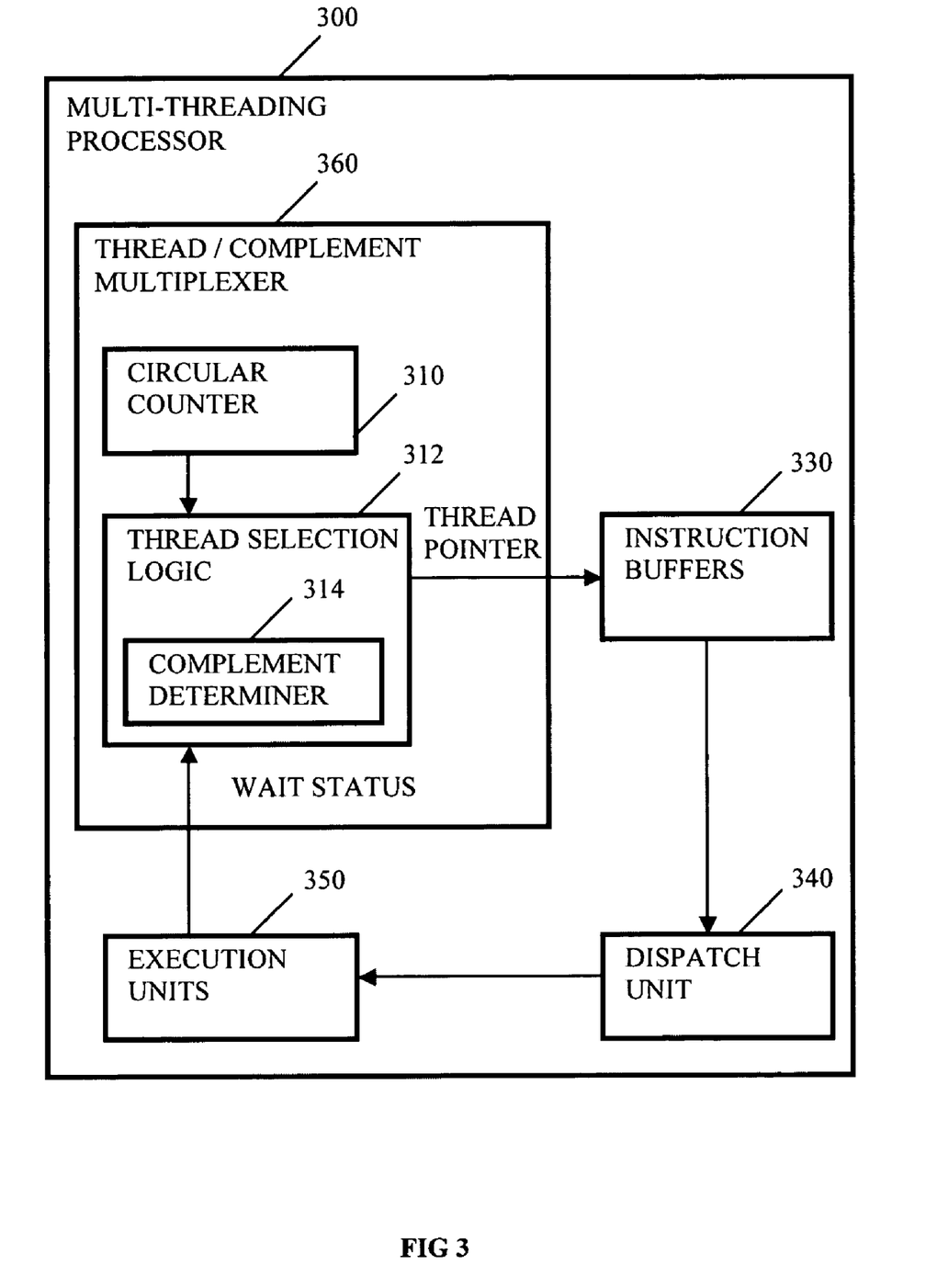
FIG. 3 depicts a multi-threading processor with a thread/complement multiplexer for selecting thread instructions to be processed by the multi-threading processor.

FIG. 3 shows an embodiment of a thread/complement multiplexer 360 within multi-threading processor 300. In this embodiment, multiplexer 360 comprises a circular counter 310 and a thread selection logic unit 312. Circular counter 310 cyclically produces an address or pointer to each next thread in the sequence of thread processed by processor 300. For example, in a 4 stage pipeline with 4 threads, circular counter 310 would produce an address or pointer to thread 1, then thread 2, then thread 3, then thread 4, then thread 1, etc.

The pointer produced by circular counter 310 is provided to thread selection logic unit 312. Thread selection logic unit 312 also receives from execution units 350 the wait status of execution of a thread. When the thread pointed to by the pointer of circular counter 310 is not in a wait status, then the thread pointer from circular counter 310 is passed to instruction buffers 330 of multi-threading processor 300. The pointer selects the buffer containing the instruction pointed to by the circular counter. The instruction of the thread pointed from circular counter 310 is passed to dispatch unit 340 and then onward to execution units 350.

If a thread in the pipeline is in a waiting status, then a pointer to the complement of the current thread is determined. The complement of a thread, i, in an n-thread process is defined to be the thread numbered (i+n/2) modulo(n). In one implementation, when the number of threads, n, is a power of 2, the complementary thread number may be obtained by complementing the most significant bit of the binary representation of the thread number. In a 4-thread process, for example, the complement of thread 1 is thread 3. The complement of thread 2 is thread 4. Similarly, the complement of thread 3 is thread 1 and the complement of thread 4 is thread 2. The complement of a thread is determined by complement determiner 314, which may be implemented using logic circuits, or by a circular counter offset by n/2 from circular counter 310. Thus, when a thread pointed to by circular counter 310 is in a wait status, complement determiner 314 generates a pointer to the instruction of the complement thread. That instruction is passed to instruction buffers 330. This causes the instruction of the complement thread to be passed to dispatch unit 340 and onward to execution units 350.

Figure 4:
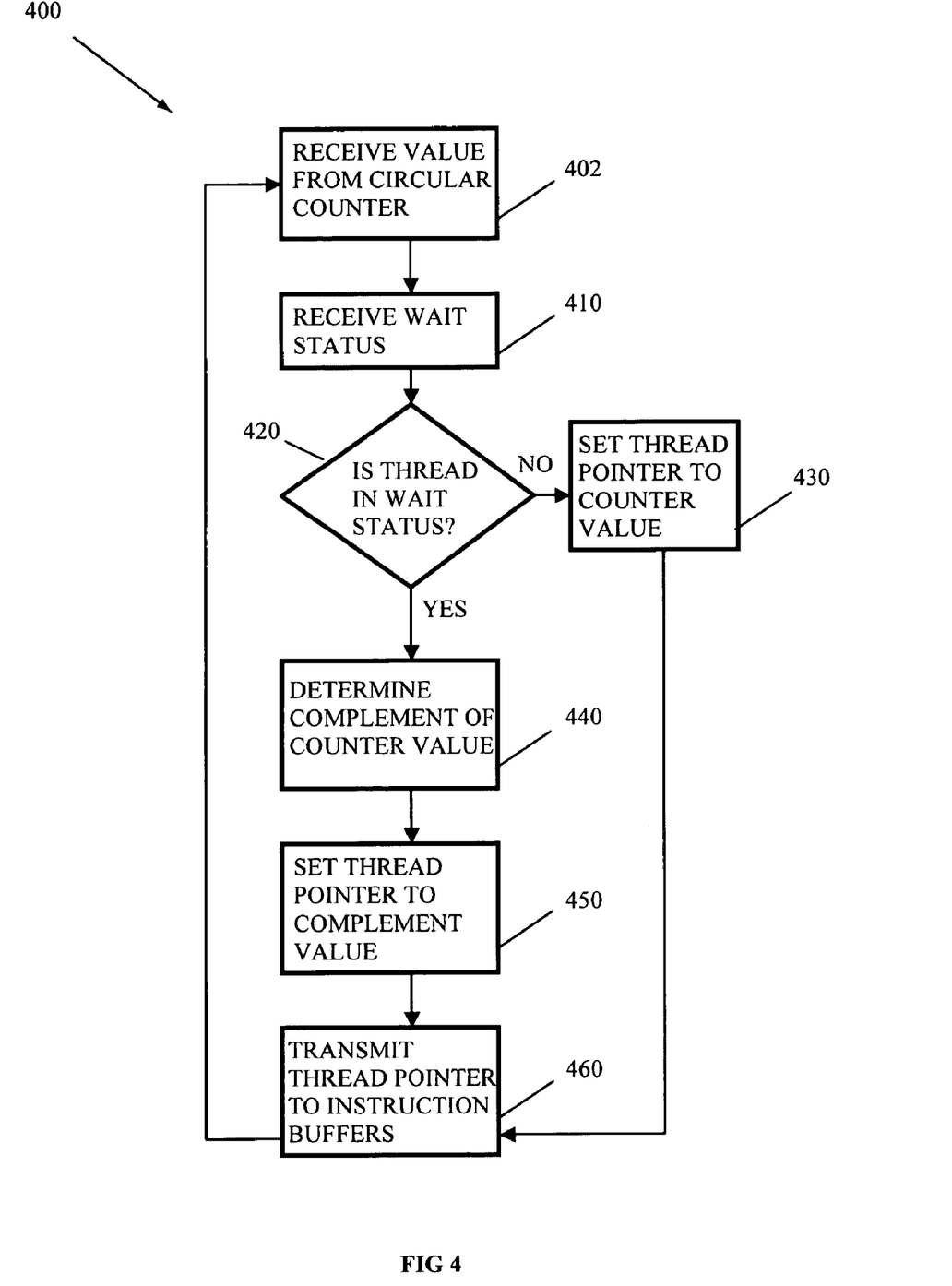
FIG. 4 depicts a flow chart of a process for selecting threads in a multi-threading processor.

FIG. 4 shows a flowchart of an embodiment of a thread/complement multiplexing process. In a step of the process, a pointer from the circular counter is received, (element 402.) The wait status of the thread pointed to by the counter is also received (element 410.) The process comprises determining from the wait status whether execution of the instructions of the thread is suspended while awaiting some event such as memory retrieval after a cache miss (element 420.) If execution is not suspended, then the thread pointer is obtained from the circular counter (element 430.) The thread pointer is transmitted to the instruction buffers to select the thread instruction to be passed to the execution units of the processor (element 460.) If execution of the thread pointed to by the circular counter is suspended (element 420) then the complement of the thread is determined (element 440.) This becomes the thread pointer (element 450) that is passed to the instruction buffers (element 460.)

Comparison of the complementary time-division multiplex method described herein to prior art methods is instructive. Table 1 shows a possible distribution of threads in a 4-stage pipeline architecture for five successive time intervals in a task-level dynamic scheme for thread selection.

TABLE 1

|  | 1 | 2 | 3 | 4 | 5 |
|---|---|---|---|---|---|
| Stage 1 | T4 | T1 | T1 | T1 | T1 |
| Stage 2 | T3 | T4 | T1 | T1 | T1 |
| Stage 3 | T2 | T3 | T4 | T1 | T1 |
| Stage 4 | T1 | T2 | T3 | T4 | T1 |

In the process depicted in Table 1, instructions for thread 1 (T1) continue to be fed into the pipeline as long as it is not in a waiting status status. This creates data hazards when instructions in an early stage of the pipeline require data produced by executing instructions in a later stage. To overcome data hazards, data is forwarded from the later stage to the earlier stage. Thus, in the time interval denoted as number 5 in Table 1, to overcome data hazards, data is forwarded from stage 4 to stage 3, stage 2 and stage 1, and from stage 3 to stage 2 and stage 1, and from stage 2 to stage 1. A considerable quantity of circuitry implements the data forwarding.

Table 2 depicts a thread distribution in a cycle level TDM scheme.

TABLE 2

|  | 1 | 2 | 3 | 4 | 5 |
|---|---|---|---|---|---|
| Stage 1 | T4 | T1 | T2 | T3 | T4 |
| Stage 2 | T3 | T4 | T1 | T2 | T3 |
| Stage 3 | T2 | T3 | T4 | T1 | T2 |
| Stage 4 | T1 | T2 | T3 | T4 | T1 |

Here, the threads are multiplexed without regard to whether a thread is in a wait state. There are no data hazards so no data forwarding circuitry is required. However, processor use is sub-optimal because wait cycles are multiplexed together with active cycles.

Table 3 depicts a thread distribution for the complementary TDM method described herein.

TABLE 3

|  | 1 | 2 | 3 | 4 | 5 |
|---|---|---|---|---|---|
| Stage 1 | T4 | T3 | T2 | T3 | T4 |
| Stage 2 | T3 | T4 | T3 | T2 | T3 |
| Stage 3 | T2 | T3 | T4 | T3 | T2 |
| Stage 4 | T1 | T2 | T3 | T4 | T3 |

In the depicted thread distribution, starting at time interval 2, the thread T1 is determined by the system to be stalled.

Therefore, the thread is replaced by its complement, T3. More specifically, the memory location of the instruction of the complementary thread replaces the waiting thread instruction. If the complement thread is not waiting for execution, then processor use may be optimized by replacing the waiting thread by its complement. Note that this method of distributing thread instructions substantially reduces data forwarding circuitry. In the 4-stage, 4-thread embodiment depicted by Table 3, data forwarding is required only from stage 4 to stage 2 and from stage 3 to stage 1. A substantial reduction in circuitry is achievable by the present invention.

Figure 5:
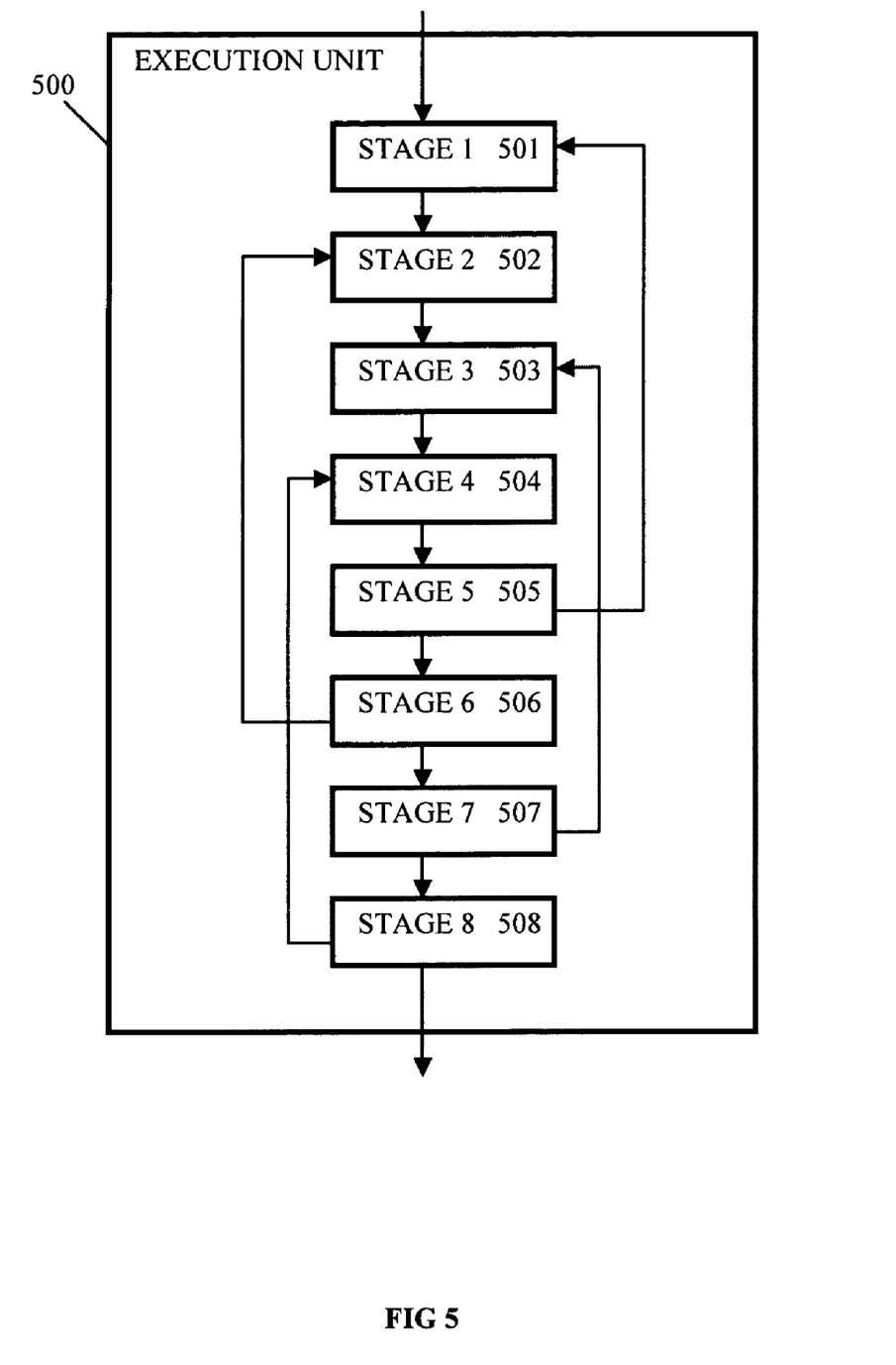
FIG. 5 depicts data forwarding in an execution unit of a multi-threading processor.

FIG. 5 shows an execution unit 500 with an eight stage pipeline implemented with data-forwarding to overcome data hazards. Forwarding is provided from the fifth stage 505 to the first stage 501, from the sixth stage 506 to the second stage 502, from the seventh stage 507 to the third stage 503, and from the eighth stage 508 to the fourth stage 504. Clearly, the forwarding circuitry to provide data-forwarding to overcome data hazards is considerably lessened by embodiments of the invention. Once again, the complement of a thread, i, in an n-thread process is defined to be (i+n/2) modulo(n). Thus, in an 8-thread system, thread 1 is the complement of thread 5 and vice versa. Thread 2 is the complement of thread 6 and vice versa. And so forth. When thread 1 is in a wait state, a thread 5 instruction is placed in the pipeline instead. Conversely, if thread 5 is in a wait state, a thread 1 instruction is placed in the pipeline. If thread 2 is in a wait state, a thread 6 instruction is placed in the pipeline. Conversely, if thread 6 is in a wait state, a thread 2 instruction is placed in the pipeline. And so forth. Possibly, of course, a complement of a thread in a wait state may also be in a wait state. But probably this will not be the case very often. Thus, the efficiency of processor use is substantially improved.

Thus, the invention provides a multi-threading processor the overcomes data hazards and improves processor efficiency. In one embodiment a plurality of execution stages are provided. Each stage is capable of performing a step in the execution of an instruction. Memory locations are provided to store instructions of different threads. A time-division multiplexer repetitively generates an ordered sequence of memory location addresses. Each address enables access to the contents of a specific memory location containing the instruction of a different thread. A complementary thread determiner determines an address that is the complement of the address currently generated by the time-division multiplexer. A thread selector selects a first thread instruction from an address provided by the multiplexer if the first thread is not in a waiting state and selects a second thread instruction from the complementary address determined by the complementary thread determiner if the first thread is in a waiting state.

Although the present invention and some of its advantages have been described in detail for some embodiments, it should be understood that various changes, substitutions and alterations can be made herein without departing from the spirit and scope of the invention as defined by the appended claims. Although an embodiment of the invention may achieve multiple objectives, not every embodiment falling within the scope of the attached claims will achieve every objective. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for thread allocation in multi-stage, multi-thread digital processing, comprising:

circularly generating an address in a sequence of n addresses corresponding to threads i=1, 2 . . . n, each address in the sequence enabling access to the contents of a different memory location, each memory location containing an instruction for a different thread i, so that each address in the sequence corresponds to a different thread i in a sequence of threads in an n thread process;

determining if execution of an ith thread corresponding to the generated address in the sequence of addresses is stalled;

selecting the memory location corresponding to the generated ith address if execution of the ith thread is not stalled;

determining and selecting a memory location corresponding to a complementary thread instruction if execution of the ith thread is stalled; wherein the complementary thread of a thread i is defined to be the thread (i+n/2) modulo(n), where is an even number greater than 3 and where n is the number of addresses in the sequence of addresses from which a thread is chosen; and submitting for execution the thread instruction from the selected memory location.

2. The method of claim 1, further comprising determining the thread that is complementary to the first thread only if the first thread is stalled.

3. The method of claim 1, further comprising:

generating a second address in the sequence of addresses corresponding to a second thread in the sequence of threads;

determining if execution of the second thread in the sequence is stalled;

selecting the memory location corresponding to the generated second address of the second thread instruction if execution of the second thread is not stalled;

determining a second complementary thread that is complementary to the second thread and selecting a memory location corresponding to the address of an instruction of the second complementary thread if execution of the second thread is stalled; wherein the complementary thread of a thread i is defined to be the thread (i+n/2) modulo(n), where n is an even number greater than 3; and submitting for execution the thread instruction from the selected memory location.

4. The method of claim 2, further comprising determining the thread that is complementary to the second thread only if the second thread is stalled.

* * * * *